(12) United States Patent
Greiner

(10) Patent No.: US 12,319,248 B2
(45) Date of Patent: Jun. 3, 2025

(54) PISTON ACTUATION DEVICE

(71) Applicant: Robert Bosch GmbH, Stuttgart (DE)

(72) Inventor: Matthias Greiner, Simmozheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 341 days.

(21) Appl. No.: 17/767,307

(22) PCT Filed: Aug. 20, 2020

(86) PCT No.: PCT/EP2020/073271
§ 371 (c)(1),
(2) Date: Apr. 7, 2022

(87) PCT Pub. No.: WO2021/089212
PCT Pub. Date: May 14, 2021

(65) Prior Publication Data
US 2022/0388488 A1   Dec. 8, 2022

(30) Foreign Application Priority Data

Nov. 5, 2019 (DE) ............... 10 2019 217 039.0

(51) Int. Cl.
*B60T 11/224* (2006.01)
*F16H 25/20* (2006.01)

(52) U.S. Cl.
CPC ............ *B60T 11/224* (2013.01); *F16H 25/20* (2013.01); *F16H 2025/2037* (2013.01); *F16H 2025/2075* (2013.01)

(58) Field of Classification Search
CPC .... B60T 11/224; B60T 13/746; B60T 13/745; F16H 25/20; F16H 2025/2037; F16H 2025/2075
See application file for complete search history.

(56) References Cited

U.S. PATENT DOCUMENTS

| 9,316,277 B2 * | 4/2016 | Winkler ................. F16D 65/18 |
| 10,174,821 B2 | 1/2019 | Durix et al. |
| 2016/0160969 A1 | 6/2016 | Durix et al. |

FOREIGN PATENT DOCUMENTS

| CN | 104641149 A | 5/2015 |
| CN | 109941257 A | 6/2019 |

(Continued)

OTHER PUBLICATIONS

WO document No. 2019149411 to Mallmann et al published on Aug. 8, 2019.*

(Continued)

*Primary Examiner* — Pamela Rodriguez
(74) *Attorney, Agent, or Firm* — NORTON ROSE FULBRIGHT US LLP

(57) ABSTRACT

A piston actuation device for the supply of a pressure medium in a pressure medium circuit of a brake system of a motor vehicle. A piston actuation device includes a piston actuable by a spindle drive to execute a back-and-forth translation movement in the direction of a piston guidance axis. The spindle drive has a spindle nut and a spindle that cooperates with the spindle nut via a screw drive. The screw drive converts a rotation movement of the spindle nut into a translation movement of the spindle in the direction of a spindle movement axis. To transmit the translation movement to the piston, the piston and the spindle are connected to each other in an axially fixed manner. The axially fixed connection between the piston and the spindle includes an articulated joint, which allows for a concentricity deviation between the piston guidance axis and the spindle movement axis.

9 Claims, 1 Drawing Sheet

(56) References Cited

FOREIGN PATENT DOCUMENTS

| | | |
|---|---|---|
| CN | 209566905 U | 11/2019 |
| DE | 102010029856 A1 | 12/2010 |
| DE | 102014212409 A1 | 12/2015 |
| DE | 102014224653 A1 | 6/2016 |
| FR | 2809464 A1 | 11/2001 |
| JP | H1053122 A | 2/1998 |

OTHER PUBLICATIONS

International Search Report for PCT/EP2020/073271, Issued Oct. 12, 2020.

\* cited by examiner

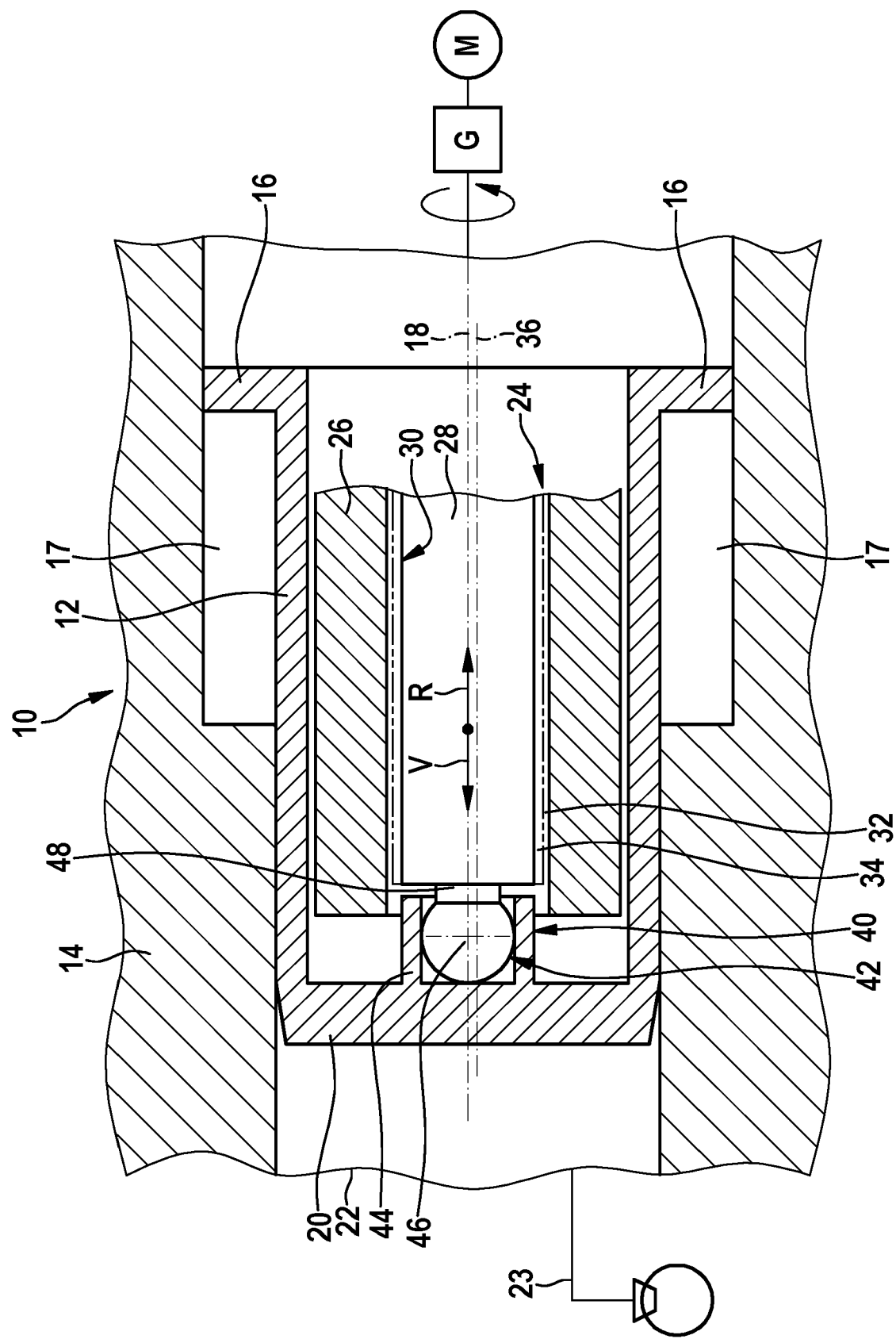

PISTON ACTUATION DEVICE

BACKGROUND INFORMATION

The present invention relates to a piston actuation device, in particular for actuating a piston for the supply of a pressure medium in a pressure medium circuit of a brake system of a vehicle featuring an electronic slip control.

Such piston actuation devices are conventional in the related art, and reference in this regard is made to German Patent Application No. DE 10 2014 212 409 A1.

The piston actuation device described in this document includes a piston, which is movably accommodated in an axial guidance of a device housing and is actuable to execute a back-and-forth translation movement along a piston guidance axis defined by the axial guidance. The piston is developed as a hollow piston that is open on one side and accommodates in its interior the spindle drive. The latter has a spindle nut in the shape of a cylinder which is able to be rotatably driven, and a spindle which is situated in an interior of this spindle nut and actuated by the spindle nut. With the aid of a gearing, the rotary movement of the spindle nut is converted into a translation movement of the spindle along a spindle movement axis. These two components are connected to each other in an axially fixed manner in order to transmit this translation movement of the spindle to the piston. In the cited related art, the piston and the spindle are developed in one piece, i.e., as a one-part component, by way of example.

A coupling of the translation movements of the spindle and piston places considerable qualitative demands on a coaxiality between the piston guidance axis in the device housing and the spindle movement axis of the spindle drive. However, since coaxility deviations are virtually unavoidable because of tolerances in the production, the transverse forces may cause wear of the axial guidance of the piston in the device housing. In order to counteract possible wear already in advance, the region of the piston guidance in the device housing is therefore provided with a wear protection. This involves a coating of the housing wall.

The production of this wear protection has the disadvantage of increasing the time and effort required to produce the device housing and thus its production cost.

SUMMARY

A piston actuation device according to the present invention may have the advantage that existing deviations in the coaxiality between the piston guidance axis and the spindle movement axis induce no wear-producing transverse forces at the axial guidance of the piston in the device housing. This reduces the tolerance and quality demands on the spindle drive and makes it possible to use spindle drives that are more cost-effective in this regard. In addition, a coating of the axial guidance of the piston in the device housing can be dispensed with, which simplifies the production of the device housing and provides further cost savings.

According to the present invention, the above-described advantages may be achieved in that an articulated joint instead of a rigid linkage of the piston to the spindle is now used, which allows such a tolerance-related concentricity deviation between the piston guidance axis and the spindle movement axis without inducing transverse forces at the axial guidance of the piston.

Additional advantages or advantageous further refinements of the present invention are disclosed herein.

In accordance with an example embodiment of the present invention, the articulated joint between the piston and spindle includes a plug element and a pluck socket, which engage with each other while forming a frictional connection. From the manufacturing point of view, the frictional connection is easily produced by plugging the plug element into the plug socket.

It is furthermore advantageous if the plug element and the plug socket of the articulated joint are integrally formed on one of their allocated components in each case because this makes it possible to produce these components in an especially economical manner while particularly not increasing the number of individual parts to be assembled. The plug element and the plug socket or the respectively coupled spindle and the piston are preferably produced from a plastic material in an injection-molding process.

A placement of the articulated joint in the interior of the piston or the spindle nut reduces a contamination tendency and a related increase in the friction conditions of the articulated joint over the service life.

The development of the plug element with an at least regionally spherically curved, i.e., ball-shaped, plug head makes it possible to at least largely avoid transverse forces on the axial guidance of the piston that occur as a result of coaxiality deviations and to do so regardless of the spatial direction in which the transverse forces are acting. In addition, the mutual alignment of the piston and spindle in order to establish the mutual connection is able to be omitted.

Instead of a gearing in the form of a conventional ball screw drive between the spindle nut and spindle, a relatively more economical screw drive is able to be provided as an alternative. While a thread of the spindle nut in a screw drives engages directly with a mating thread on the spindle, the torque transmission in a ball screw drive takes place indirectly via balls that are situated in ball orbits. These ball orbits are developed with a first part of their orbit cross-section on the spindle nut and a second part on the spindle. In comparison, screw drives that have a simpler design are characterized by their high mechanical efficiency, among other things.

An example embodiment of the present invention is shown in the FIGURE and is described below in greater detail.

BRIEF DESCRIPTION OF THE DRAWING

The FIGURE shows, in a longitudinal section, a piston actuation device developed according to an example embodiment of the present invention.

DETAILED DESCRIPTION OF EXAMPLE EMBODIMENTS

The single FIGURE (FIG.) shows a piston actuation device 10 having a piston 12, which is accommodated in a torsionally fixed and axially displaceable manner in a recess of a device housing 14. This piston 12 is developed in the form of a hollow piston which is open on one side and has multiple radially protruding projections 16 at its open end. These projections 16 extend along a portion of the piston circumference in each case and engage with allocated axial guides 17 on device housing 14. On the one hand, axial guides 17 define a piston guidance axis 18, and on the other hand, they cooperate with radial projections 16 as a torque support for piston 12. The latter prevents a rotary movement of piston 12 in device housing 14.

With the aid of a closed piston bottom 20, piston 12 bounds a working chamber 22 which is developed in device housing 14 and filled with a pressure medium. Its volume is variable as a function of an actuation of piston 12. For instance, if piston 12 is driven to the left or a forward direction (directional arrow V) in the FIGURE, then the volume of working chamber 22 decreases and existing pressure medium is displaced from pressure chamber 22 into a connected pressure medium circuit 23. Pressure medium circuit 23 is illustrated by the symbol of a wheel brake in the FIGURE. In response, the pressure level in the pressure medium circuit rises. If piston 12 moves to the right or the reverse direction (directional arrow R), however, the volume of working chamber 22 increases, pressure medium flows out of pressure medium circuit 23 back into working chamber 22, and the pressure level in pressure medium circuit 23 drops. A non-linear functional relationship, which is representable by what is termed a pressure/volume characteristic curve, exists between the pressure change in pressure medium circuit 23 and the volume change of working chamber 22.

To actuate piston 12 in one or the other movement direction (directional arrows V, R), piston actuation device 10 is equipped with a spindle drive 24. This spindle drive 24 is accommodated in the hollow interior of piston 12 and includes a hollow-cylindrical spindle nut 26 and also a spindle 28 accommodated in the interior of this spindle nut 26. Spindle nut 26 and spindle 28 cooperate with each other via a screw drive 30. To this end, an inner thread 32 is developed on the inner circumference of spindle nut 26, which engages directly with an outer thread 34 developed on the outer circumference of spindle 28.

As an alternative (not shown), it would be possible to replace this screw drive 30 with a ball screw drive in which balls are situated in a gap between the spindle and spindle nut and run in a ball orbit of which a first part of the orbit cross-section is developed on the spindle and a second part is developed on the spindle nut. In this case, the spindle nut and spindle engage with one another indirectly via the balls.

Spindle nut 24 is rotatably mounted in a stationary manner and executes a rotation movement. The drive of spindle nut 26 required for this purpose is shown by symbols in the FIGURE. It is disposed in the region of the open end of piston 12 and has an electronically actuable motor M and preferably a gearing G which is connected between motor M and spindle nut 26.

The rotation movement induced in spindle nut 26 is transmitted via screw drive 30 to spindle 28. As may be gathered from the following explanations, the latter is secured against a co-rotation with spindle nut 26 and therefore executes a back-and-forth translation movement relative to spindle nut 26 along a spindle movement axis 36. This translation movement is transmitted to piston 12. Spindle 28 and piston 12 are connected to each other in a torsionally and axially fixed manner for this purpose. This connection is placed in the region of the closed interior of piston 12 and according to the present invention includes an articulated joint 40, which allows for a concentricity deviation between piston guidance axis 18 and spindle movement axis 36.

To this end, articulated joint 40 includes a plug element 42, which is developed at the end of spindle 28, and a plug socket 44, which is developed on the inside of piston bottom 20. By way of example, plug element 42 and plug socket 44 are developed in one piece with spindle 28 and piston 12, respectively.

Plug element 42 extends coaxially in the direction of the longitudinal axis of spindle 28 and at least regionally has a spherically curved plug head 46. The latter is developed via a shaft 48 at the end of spindle 28 situated in the interior of spindle nut 26, the shaft being reduced in its outer diameter in comparison with the outer diameter of this plug head 46.

Plug socket 44 is developed on the inner side of piston bottom 20 concentrically with respect to plug element 46. It has a hollow-cylindrical cross-section into which plug element 42 is pressed and kept under radial pretensioning.

When the connection is established between spindle 28 and piston 12, plug socket 44 is widened by the pressure on spherically curved plug head 46 until plug head 46 is finally able to penetrate the interior of plug socket 44 to such an extent that it has no more than a small distance from the inner side of piston bottom 20, as shown in the FIGURE.

With the introduction of plug head 46 into plug socket 44, the two involved elements touch each other along a line along the outer circumference of plug head 46. A clamping force that comes about between plug head 46 and plug socket 44 is adjustable in an application-specific manner by adapting the geometrical dimensions and the elasticity of the material of plug element 42 and plug socket 44 in such a way that no relative movement in the radial direction, i.e., no radial slip, is to be anticipated between plug head 46 and plug socket 44 under the expected drive forces of spindle nut 26 on spindle 28.

Plug socket 44 extends in the axial direction to such an extent that its free end terminates in the region of shaft 48 of plug element 42. This allows for limited mutual pivoting transversely to the piston guidance axis 18 or transversely to spindle movement axis 36, and thus for a coaxiality deviation between piston guidance axis 18 and spindle movement axis 36 without the occurrence of transverse forces that stress of the axial guidance of piston 12 in device housing 14.

In the final analysis, because of provided articulated joint 40, the guidance region of piston 12 in device housing 14 is subjected to less mechanical stress and does not require an additional wear protection. This saves the expense of producing a device housing 14 and thus also production costs.

Modifications of or supplementations to the described exemplary embodiment are of course possible.

What is claimed is:

1. A piston actuation device for supply of a pressure medium in a pressure medium circuit of an electronically slip-controllable brake system of a motor vehicle, comprising:
   a device housing;
   a piston accommodated in a displaceable manner in a guide of the device housing, which bounds a working chamber of the device housing and is actuable by a spindle drive for executing a back-and-forth translation movement along a piston guidance axis between a plurality of axial positions of the piston relative to the device housing to modify a volume of the working chamber for the supply of the pressure medium, the spindle drive having:
      a spindle nut configured to be driven to execute a rotation movement at least partially within the piston; and
      a spindle, which cooperates with the spindle nut in such a way that the rotation movement of the spindle nut is converted into a back-and-forth translation movement of the spindle along a spindle movement axis, wherein the piston is connected to the spindle in an axially fixed manner for a transmission of this translation movement;

wherein:

an axially fixed connection between the piston and the spindle includes an articulated joint that:

allows for a concentricity deviation between the piston guidance axis and the spindle movement axis; and includes:

a plug socket;

a ball plug that is inserted into an interior of the plug socket and includes a region that is spherical, forms a majority of the ball plug, and terminates, on a side of the ball plug facing in a direction out of the ball socket, with a straight edge extending approximately perpendicularly to the piston guidance and spindle movement axes; and a shaft that (I) is rectangular in cross-section, (II) is formed in one piece with the straight edge of the ball plug, (III) extends, with an extension length that is less than a length of extension of the spherical region of the ball plug in a direction of the piston guidance axis, from the straight edge of the ball plug to outside of the plug socket, (IV) is connected to a surface of one of the spindle and the piston; and the spindle, the piston, and the articulated joint are arranged and structured so that, in each of at least a subset of the plurality of axial positions of the piston, at least a portion of the plug socket, at least a portion of the shaft, and at least a portion of the spindle are all located within the spindle nut.

2. The piston actuation device as recited in claim 1, wherein the ball plug is pressed into, and retained within, the plug socket under a radial pretensioning.

3. The piston actuation device as recited in claim 1, wherein the ball plug and the shaft are developed in one piece with an end of the spindle facing the piston, and the plug socket is developed in one piece with an inner side of a piston bottom of the piston.

4. The piston actuation device as recited in claim 1, wherein the plug socket has a hollow-cylindrical cross-section in which the ball plug is retained under radial pretensioning.

5. The piston actuation device as recited in claim 1, wherein the spindle nut and the spindle cooperate with each other via a screw drive in which a thread developed on the spindle nut engages directly with a mating thread developed on the spindle.

6. The piston actuation device as recited in claim 1, wherein the plug socket is developed in one piece with an end of the spindle facing the piston, and the ball plug and shaft are developed in one piece with an inner side of a piston bottom of the piston.

7. The piston actuation device as recited in claim 1, wherein, the shaft forms a stepped profile with the surface of the one of the spindle and the piston.

8. The piston actuation device as recited in claim 7, wherein the shaft is rectangular in cross-section.

9. The piston actuation device as recited in claim 8, wherein an exterior surface of the shaft, which is rectangular in cross-section, is cylindrical.

* * * * *